US011722979B2

(12) United States Patent
Chowdhury et al.

(10) Patent No.: US 11,722,979 B2
(45) Date of Patent: Aug. 8, 2023

(54) METHOD FOR PRECISE TIMESTAMPING OF NARROWBAND SIGNALS IN THE PRESENCE OF MULTIPATH

(71) Applicant: ZaiNar, Inc., Redwood City, CA (US)

(72) Inventors: Mainak Chowdhury, Redwood City, CA (US); Philip Kratz, Redwood City, CA (US)

(73) Assignee: ZaiNar, Inc., Redwood City, CA (US)

( * ) Notice: Subject to any disclaimer, the term of this patent is extended or adjusted under 35 U.S.C. 154(b) by 653 days.

(21) Appl. No.: 16/846,030

(22) Filed: Apr. 10, 2020

(65) Prior Publication Data

US 2020/0329449 A1    Oct. 15, 2020

Related U.S. Application Data

(60) Provisional application No. 62/832,096, filed on Apr. 10, 2019.

(51) Int. Cl.
*G01S 5/02* (2010.01)
*H04L 7/00* (2006.01)
(Continued)

(52) U.S. Cl.
CPC ........... *H04W 56/0065* (2013.01); *G01S 5/02* (2013.01); *H04L 7/007* (2013.01); *H04L 7/06* (2013.01);
(Continued)

(58) Field of Classification Search
CPC ......... H04W 56/0065; H04W 72/0446; H04W 56/001; G01S 19/48; H04B 3/54; H04B 1/04
See application file for complete search history.

(56) References Cited

U.S. PATENT DOCUMENTS 6,208,871 B1 *    3/2001    Hall ................... H04W 56/001
                                                         370/335
10,903,866 B1    1/2021    Kratz et al.
(Continued)

OTHER PUBLICATIONS

International Search Report and Written Opinion from International Application No. PCT/US22/25828, 10 pages.
(Continued)

*Primary Examiner* — Iqbal Zaidi
(74) *Attorney, Agent, or Firm* — Run8 Patent Group, LLC; Peter Miller

(57) ABSTRACT

A method for detecting times-of-arrival of signals comprising, at a receiving node: during a time slot, receiving a signal comprising a carrier signal characterized by a carrier frequency and modulated by a template signal defining a code sequence characterized by a transmitter chip period; demodulating the signal according to a local oscillator frequency to generate a received baseband signal, the local oscillator frequency and the carrier frequency defining a desynchronization ratio characterized by a denominator greater than a threshold denominator; sampling the received baseband signal at the transmitter chip period to generate a set of digital samples; generating a reconstructed baseband signal based on the set of digital samples; calculating a cross-correlation function comprising a cross-correlation of the reconstructed baseband signal and the template signal; and calculating, on the fine time grid, a time-of-arrival of the signal based on the cross-correlation function.

18 Claims, 6 Drawing Sheets

(51) Int. Cl.
  *H04L 7/06* (2006.01)
  *H04W 56/00* (2009.01)
  *H04W 72/0446* (2023.01)
(52) U.S. Cl.
  CPC ..... *H04W 56/001* (2013.01); *H04W 72/0446* (2013.01)

(56) References Cited

U.S. PATENT DOCUMENTS

| | | |
|---|---|---|
| 10,903,915 B1 | 1/2021 | Kratz et al. |
| 2006/0215583 A1 | 9/2006 | Castagnoli |
| 2007/0205944 A1 | 9/2007 | Lyons |
| 2009/0232113 A1 | 9/2009 | Tamaki |
| 2013/0322426 A1 | 12/2013 | Niranjayan et al. |
| 2016/0099700 A1 | 4/2016 | Tavakol et al. |
| 2016/0154116 A1* | 6/2016 | Farrokhi ............... G01S 19/246 342/357.31 |
| 2020/0309531 A1* | 10/2020 | Cui ........................ G01P 15/14 |
| 2021/0006389 A1 | 1/2021 | Kratz et al. |
| 2021/0243713 A1 | 8/2021 | Ellenbeck et al. |

OTHER PUBLICATIONS

Non-Final Office Action for U.S. Appl. No. 17/338,543 dated May 12, 2022.
Non-Final Office Action from U.S. Appl. No. 16/862,080 dated May 6, 2022.

* cited by examiner

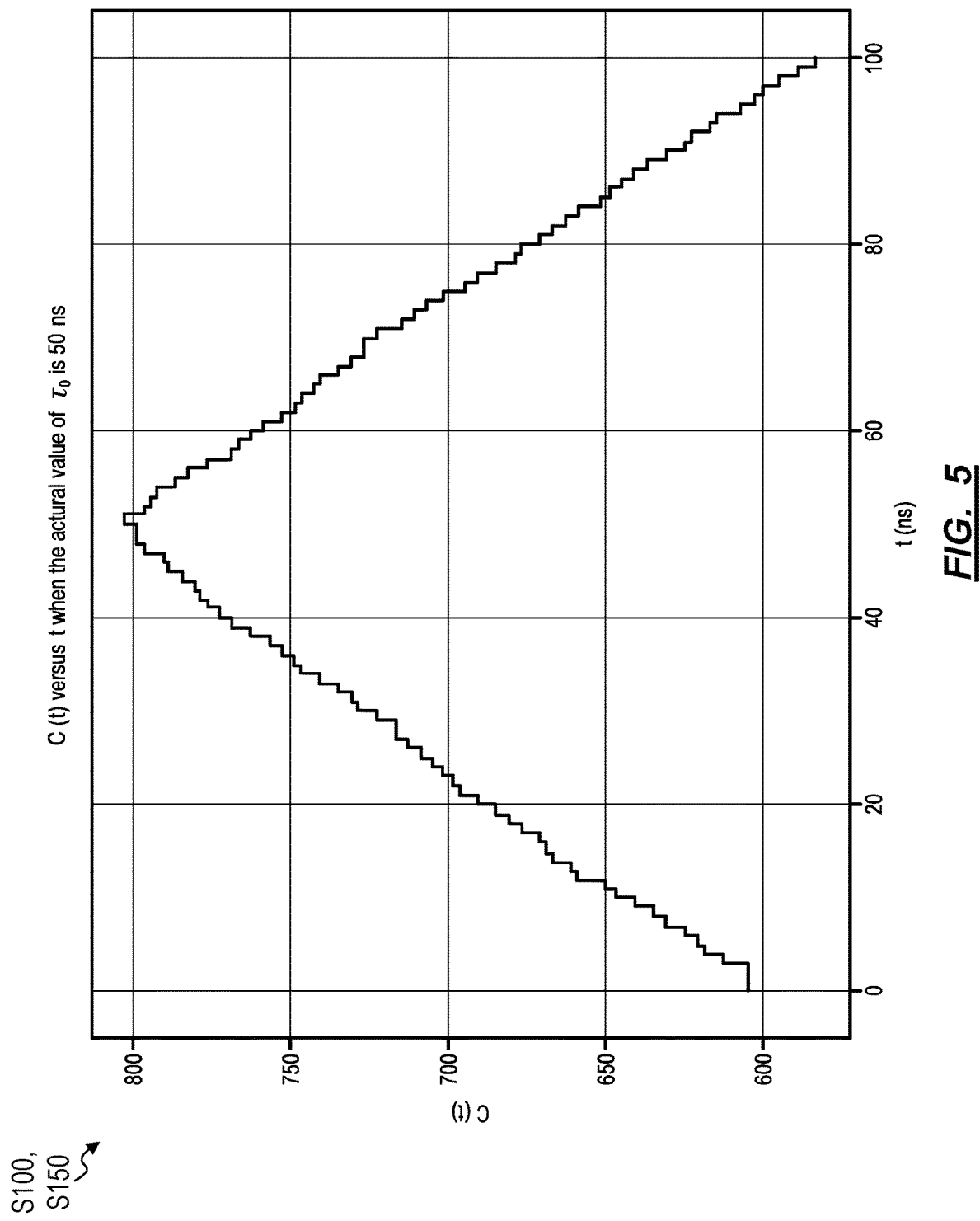

ME THOD FOR PRECISE TIMESTAMPING OF NARROWBAND SIGNALS IN THE PRESENCE OF MULTIPATH

CROSS-REFERENCE TO RELATED APPLICATIONS

This application claims the benefit of U.S. Provisional Application No. 62/832,096, filed on 10 Apr. 2019, which is incorporated in its entirety by this reference.

This application is related to U.S. patent application Ser. No. 16/405,922, filed on 7 May 2019, and U.S. patent application Ser. No. 16/588,722, filed on 20 Sep. 2019, which are incorporated in their entireties by this reference.

TECHNICAL FIELD

This invention relates generally to the field of signal processing and more specifically to a new and useful method for timestamping or time-of-arrival detection in the field of signal processing.

BRIEF DESCRIPTION OF THE FIGURES

FIG. 5 is a flowchart representation of one variation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
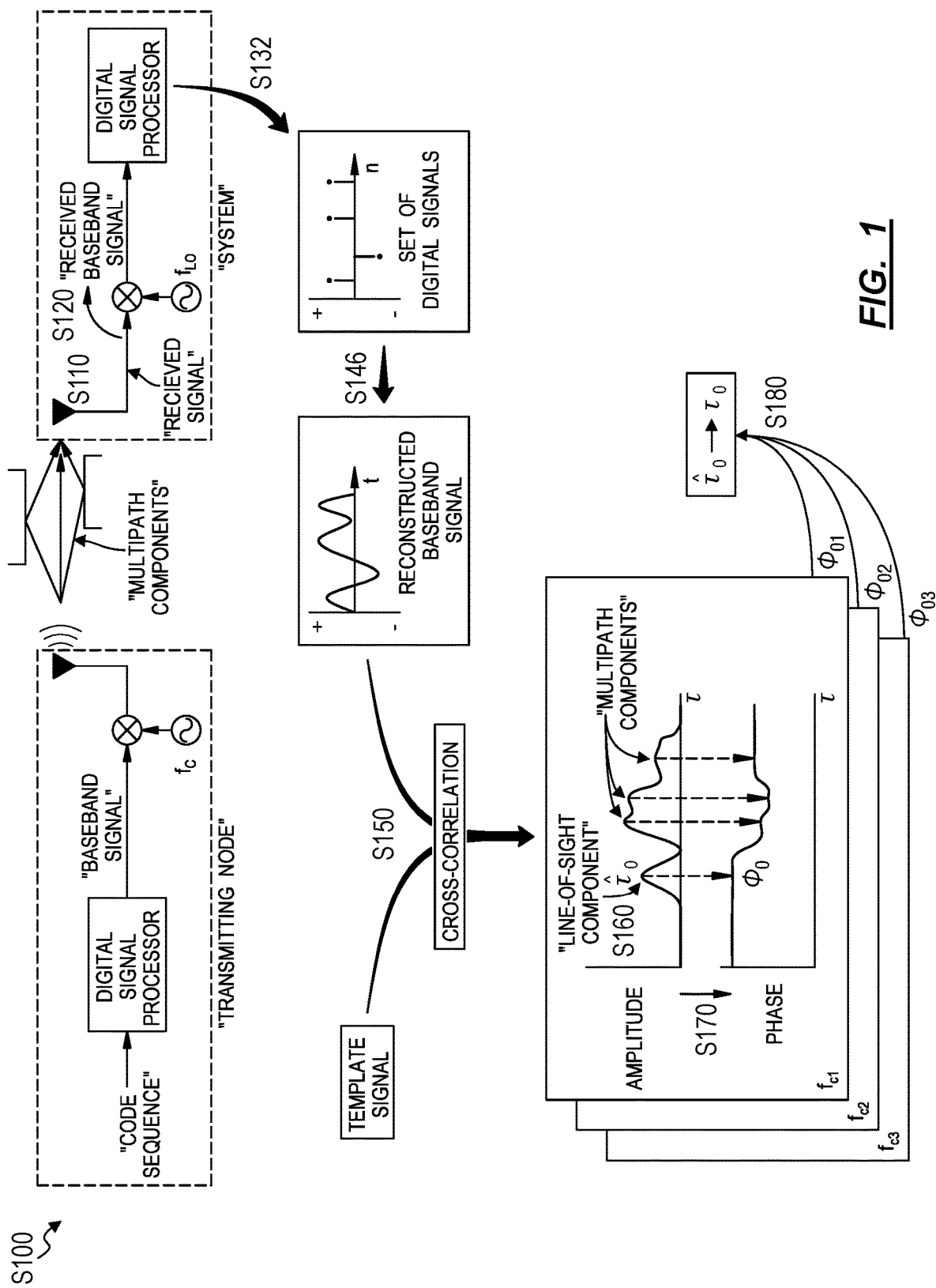
FIG. 1 is a flowchart representation of a method.

As shown in FIG. 1, a method S100 for detecting times-of-arrival of signals includes, at a receiving node: during a time slot, receiving a signal comprising a first carrier signal characterized by a first carrier frequency and modulated by a first template signal defining a first code sequence characterized by a transmitter chip period in Block S110; demodulating the signal according to a local oscillator frequency to generate a received baseband signal, the local oscillator frequency and the carrier frequency defining a desynchronization ratio in irreducible form characterized by a denominator greater than a threshold denominator in Block S120; sampling the received baseband signal at the transmitter chip period to generate a set of digital samples in Block S132; generating, on a fine time grid, a reconstructed baseband signal based on the set of digital samples, the fine time grid characterized by a time resolution less than the transmitter chip period in Block S140; calculating, on the fine time grid, a cross-correlation function comprising a cross-correlation of the reconstructed baseband signal and the template signal in Block S150; and calculating, on the fine time grid, a time-of-arrival of the signal based on the cross-correlation function in Block S160.

Figure 2:
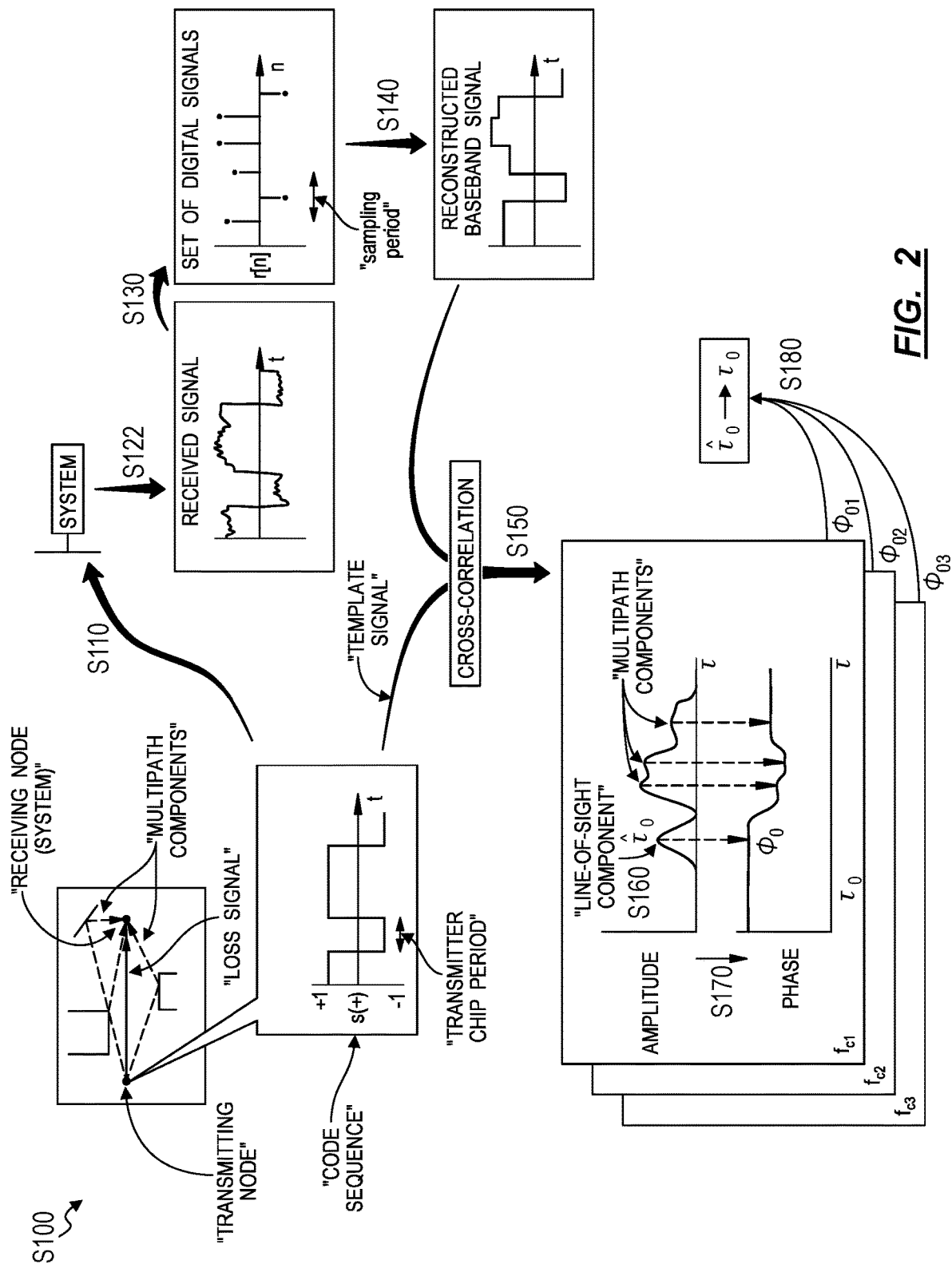
FIG. 2 is a flowchart representation of one variation of the method.

As shown in FIG. 2, one variation of the method S100 includes: receiving the signal comprising a template signal defining a code sequence characterized by a transmitter chip period in Block S110; demodulating the signal to generate a received baseband signal in Block S122; sampling the received baseband signal at a receiver sampling period to generate a set of digital samples, the receiver sampling period and the transmitter chip period defining a desynchronization ratio in irreducible form characterized by a denominator greater than a threshold denominator in Block S130; generating, on a fine time grid, a reconstructed baseband signal based on the set of digital samples, the fine time grid characterized by a time resolution less than the receiver sampling period and less than the transmitter chip period in Block S140; calculating, on the fine time grid, a cross-correlation function comprising a cross-correlation of the reconstructed baseband signal and the template signal in Block S150; and calculating, on the fine time grid, the time-of-arrival of the signal based on the cross-correlation function in Block S160.

2. Applications

Generally, the method S100 is executed by the receiver node system (hereinafter "the system") including networking hardware—such as an antenna, transceiver hardware (e.g., a homodyne, a heterodyne, or a super heterodyne architecture), an FPGA/DSP core, and a clock (e.g., a quartz crystal oscillator)—in order to improve time-of-arrival (hereinafter "TOA") resolution and overcome effects of multipath fading while timestamping received signals. In particular, the system can execute Blocks of the method S100 to calculate a TOA of a narrowband signal (e.g., five MHz)—broadcasted by a transmitting node—in the presence of a multipath environment with a delay spread, such as to within a fraction (e.g., less than one-tenth) of the delay spread. For example, the system can calculate the time of arrival of a narrowband signal in an indoor wireless multipath channel with a delay spread of tens of nanoseconds to within one nanosecond without operating at a prohibitively high sampling rate.

More specifically, the system can: receive a signal—characterized by a carrier frequency—broadcast by a transmitting node (or other device); demodulate the received signal according to a local oscillator frequency of the system that is desynchronized from the carrier frequency of the signal; sample the received signal to generate a set of digital samples; generate a reconstructed baseband signal on a fine time grid (i.e., a grid characterized by sub-sample time-resolution) based on the set of digital samples; calculate a cross-correlation function (e.g., a matched filter) between a template of the transmitted baseband signal and the reconstructed baseband signal on the fine time grid; calculate an amplitude response of the cross-correlation function on the fine time grid; identify a set of peaks representing TOAs of multipath components of the signal based on the amplitude response; and identify a peak corresponding to the line-of-sight (hereinafter "LOS") TOA of the signal. Thus, by varying the local oscillator frequency relative to the carrier frequency of the signal according to a desynchronization ratio (between the carrier frequency and the local oscillator frequency), the system can desynchronize the correspondence between symbols of the transmitted baseband signal and symbols of the reconstructed baseband signal, thereby enabling the system to calculate LOS TOAs for narrowband and multipath faded signals characterized by sub-sample-period accuracy, such as within one nanosecond for a signal spanning five MHz of analog bandwidth.

In one variation, the system alternatively desynchronizes the receiver sampling period from a chip period of the signal (hereinafter the "transmitter chip period") in order to desynchronize digital samples of the received signal from the symbols of the signal, thereby also enabling subsample resolution upon cross-correlation of the reconstructed baseband signal and a template signal. More specifically, the system can: receive a signal broadcast by the transmitting node; demodulate the received signal; sample the received signal at a receiver sampling period (or, equivalently, a "receiver sampling rate")—that differs from the transmitter chip period (or, equivalently, the "transmitter chip rate") of the signal—to generate a set of digital samples; generate the reconstructed baseband signal on a fine time grid based on the set of digital samples; calculate a cross-correlation function between a template of the transmitted baseband signal and the reconstructed baseband signal on the fine time grid; calculate an amplitude response of the cross-correlation function; identify a set of peaks representing TOAs of multipath components of the signal based on the amplitude response; and identify a peak corresponding to the LOS TOA of the signal.

In instances in which the system fails to estimate the LOS TOA of the signal to within a target accuracy, the system can execute additional phase extraction and refinement techniques to further improve the accuracy of the LOS TOA calculation. More specifically, the system can calculate a phase response of the cross-correlation function; extract the carrier phase of the signal corresponding to the identified peak of the amplitude response; and refine the LOS TOA estimate based on this carrier phase over multiple narrow (e.g., five MHz frequency bands).

When executing Blocks of the method S100, the system receives a signal from the transmitting node. In particular, the signal can include a carrier signal characterized by a carrier frequency modulated by a code sequence defined by a transmitter chip period. Thus, the signal carries the code sequence at a bit/symbol rate defined by the transmitter chip period modulated within a carrier signal characterized by the carrier frequency. When propagating through an external environment, the signal may be affected by multipath fading such that the system receives multiple attenuated repetitions of this signal. The system can then demodulate the signal according to a desynchronized local oscillator frequency or sample the received signal at a desynchronized sampling rate in order to determine the TOA of the signal to within smaller fractions of the receiver sampling period. In accordance with the above described method, the system can also achieve greater time resolution when calculating the TOA for signals of longer durations due to the improved performance of matched filters for longer signal durations.

However, given limitations in transmission time for the signal (e.g., in a TDMA slot), the system may receive a signal of a short duration (e.g., tens of microseconds). For shorter signal durations, a cross-correlation function generated by the system may exhibit wider peaks that prevent the system from identifying the TOA of the signal from the cross-correlation function via peak finding methods, especially when the multipath delay spread is smaller than the peak width. In these instances, the system can leverage characteristics of the cross-correlation function to recover the phase of each multipath component detected, wherein each phase corresponds to a peak identified in the cross-correlation function. More specifically, the phase response of the cross-correlation function exhibits relative flatness around peaks in the amplitude response of the cross-correlation function. Therefore, even if the time corresponding to the earliest peak in the cross-correlation does not represent the TOA of the LOS component of the signal within the target degree of accuracy, the system can recover an estimate of the carrier phase corresponding to the LOS multipath component of the signal.

Therefore, in the context of a two-way ranging application, the system can statistically refine an initial TOA estimate for the signal based on the phase information for the LOS component of the signal in addition to an initial estimate of the transmission time of the signal. Since the phase information is enhanced by the accuracy of the peak time estimate, the system can repeat the process (of phase estimates, then peak time estimate, then phase estimate again) iteratively. The system can, in addition, execute multiband signal processing to: calculate multiple carrier phases for each carrier frequency carrying the signal; calculate the propagation time of the LOS signal based on the set of carrier phases and statistical refinement techniques; and, based on the propagation time of the signal, calculate the TOA of the signal.

In one implementation, the system can execute deconvolution and adaptive methods to further improve the calculation of the LOS TOA of the signal despite the challenges imposed by multipath fading. For example, the system can pre-compute the shape of the cross-correlation function, given the code sequence, the number of symbols, and the desynchronization ratio; and perform deconvolution to derive the TOA of each multipath component comprising the received signal. In another example, the system can communicate with the transmitting node to adaptively increase the signal length in order to better estimate the TOA of the signal.

Thus, by executing Blocks of the method S100, the system can calculate the LOS TOA of a signal to within one nanosecond. In applications in which the system also executes a time synchronization protocol or a two-way ranging protocol—such as the protocols described in U.S. patent application Ser. No. 16/405,922—the system, by timestamping signals transmitted according to this protocol according to the method S100, can further improve the accuracy of these protocols to within one nanosecond while calculating the time bias between two transceivers or the propagation delay between two transceivers. Additionally, for instances in which the system and/or other transceivers with which the system is communicating are located in a multipath-producing environment (e.g., warehouses, constructions sites, offices, urban environments, and orbital environments), the system, by executing the method S100, can maintain sub-nanosecond accuracy in the presence of these multipath-producing environments.

3. Syntonization

While executing the method S100, the system can first eliminate the frequency drift between the clock of the system and a clock of the transmitting node such that the frequency offset between the transmitting node and the system (i.e., the receiving node) is within a threshold frequency offset (e.g., the system syntonizes the clocks of the system and the transmitting node). A process for syntonization between nodes in a network is described in U.S. patent application Ser. No. 16/588,722, which is incorporated by reference in its entirety.

In addition to syntonizing the clocks of the transmitting node and the system to within a threshold frequency offset (e.g., to within one part-per-billion), the system can also characterize this frequency offset and account for this frequency offset when controlling the local oscillator frequency or the receiver sampling frequency, thereby maintaining a target desynchronization ratio for the signal. More specifically, the system can: characterize a frequency offset between the receiving node and a transmitting node of the signal; and calculate an adjusted local oscillator frequency based on the local oscillator frequency and the frequency offset, the adjusted local oscillator frequency and the carrier frequency defining the desynchronization ratio; and downconvert the signal according to the adjusted first local oscillator frequency to generate the first received baseband signal. For example, upon detecting a frequency offset between the transmitting node and the system equal to ten MHz, the system can adjust the local oscillator frequency by ten MHz such that the actual desynchronization ratio between the carrier frequency of the signal and the local oscillator frequency matches a target desynchronization ratio. Thus, the system can ensure that the actual desynchronization ratio between the carrier frequency and the local oscillator frequency of the system matches a target desynchronization ratio between the carrier frequency and the local oscillator frequency.

In another implementation, the system can characterize and/or predict a relative frequency drift between clocks of the transmitting node and the system and modify the duration of the signal to account for the predicted frequency drift over the duration of the signal. More specifically, the system can: characterize a frequency drift between the receiving node and a transmitting node of the transmitting signal; calculate the time slot for receiving the signal based on the frequency drift; and configure the transmitting node to transmit the first signal characterized by a first duration less than the first time slot. For example, the system can: predict that the frequency offset between the transmitting node and the system will increase by two parts-per-billion during a time slot; and, therefore, shorten this time slot and the duration of the signal by a factor of two in order to maintain a frequency drift during the time slot less than a threshold frequency drift. Thus, the system can adapt the duration of the signal and the time slot during which the signal is received by the system, in order to minimize the effects of frequency drift on the efficacy of the LOS TOA calculation for the signal.

4. Signal Characteristics

Figure 3:
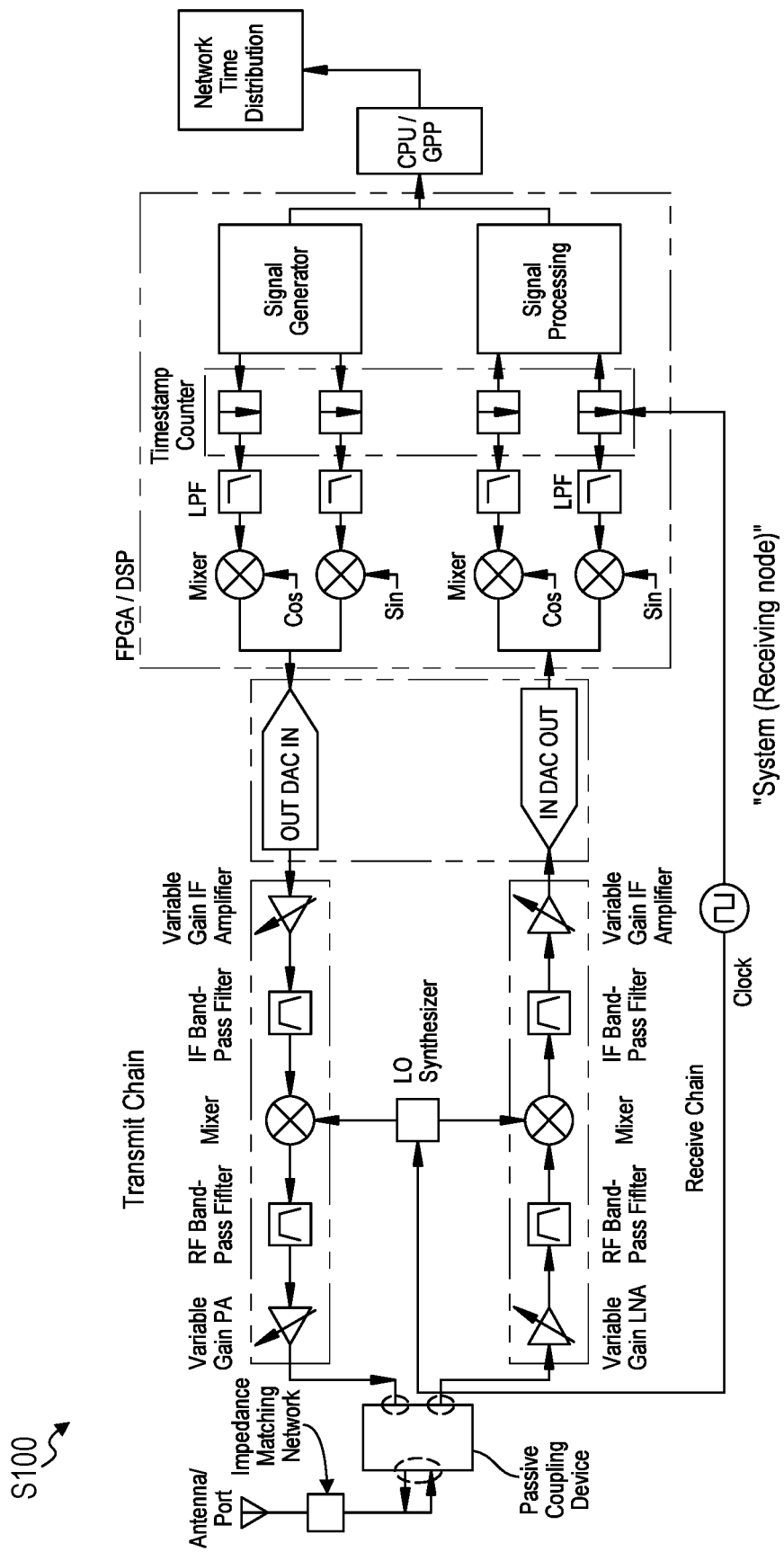
FIG. 3 is a schematic representation of a system.

The system, as shown in FIG. 3 can receive and timestamp (i.e., calculate a TOA for) signals (i.e., signals received by the signal) defining particular characteristics. Generally, the signal can include a carrier signal modulated (e.g., via quadrature modulation) by a complex valued baseband signal (e.g., a phase shift keyed signal) generated from a known code sequence to improve the signal-to-noise ratio of the signal as it is received at the system. More specifically, the system includes a carrier signal characterized by a carrier frequency, $f_c$, modulated by a baseband signal that can include a code sequence at a transmitter chip period, $T'_c$. However, the system can calculate the TOA of any sequence assuming the data sequence transmitted in the signal is accessible to the system such that the system can generate a template signal for executing the super-resolved matched filter and therefore identify the signal.

Additionally, the system can receive and calculate the LOS TOA of signals transmitted over multiple simultaneous carrier frequencies. More specifically, the system can receive a signal including multiple narrowband frequency components in order to extract phase information from each frequency component and therefore further refine the estimate of the LOS TOA of the signal, as further described below.

4.1 Baseband Signal

Generally, the system receives the signal including a baseband signal that further includes a code sequence. More specifically, the system can receive signals including a pseudorandom code sequence, such as a Bernoulli code sequence, a maximal length code sequence, a Gold code sequence, a Kasami code sequence, a Barker code sequence, a Zadoff-Chu code sequence, or any other perfect code sequence. In one implementation, the system can receive and timestamp signals including a code sequence that includes a constant amplitude, zero autocorrelation waveform in order to increase the sharpness of peaks generated in amplitude response of the cross-correlation function.

The system can calculate the TOA of the signal within a shorter signal duration for signals with target auto-correlation properties (e.g., a high autocorrelation at zero delay and a low autocorrelation elsewhere). The system can receive signals with a baseband signal, s(t), of the form:

$$s(t) = \sum_{n=0}^{N-1} b_n g'(t - nT'_c),$$

where $T'_c$ is the transmitter chip period, $b_n$ (e.g., in $\{-1, 1\}$) is the known code sequence $\{b_n\}_{n=0}^{\infty}$, and g'(t) is the chip waveform (a rectangular pulse or any other pulse shape). Thus, the time duration of the signal is $NT'_c$.

4.1.1 Signal Duration

The signal is characterized by a duration, $NT'_c$, that can vary depending on the implementation. However, the system, by executing Blocks of the method S100, can more accurately identify signals of a longer duration based on the desynchronization ratio and super-resolved matched filter further described below. Thus, the duration of an ideal signal for timestamping by the system may be characterized by a duration less than the available time in a particular communication slot (e.g., TDMA slot) but long enough to achieve the target accuracy of the calculated time-of-arrival for the system.

In some implementations, the system is performing other communication and/or ranging functions and therefore receives the signal during a limited time slot (e.g., 66 microseconds for an LTE protocol). In this implementation, the system or another related system can communicate with the transmitting node to modify the signal duration such that the signal duration is shorter than the duration of the time slot.

4.2 Carrier Signal

Generally, the system can receive a signal including a carrier signal modulated by the code sequence. More specifically, the system can receive a signal including a carrier signal characterized by a carrier frequency generated according a local oscillator of the transmitting device. Thus, in the desynchronized demodulation variation, the system can coordinate with the transmitting node to verify that the local oscillator frequency of the transmitting node and the local oscillator frequency of the system define the desynchronization ratio. Furthermore, the system can derive additional information, such as the carrier phase of the signal, to refine the calculation of the TOA of the signal, as further described below. The system can therefore receive a signal characterized by any type of modulation, such as amplitude modulation, frequency modulation, or phase modulation.

In one implementation, in order for the system to receive a signal according to standard RF transceiver technology, the system can receive a passband signal generated from the baseband signal described above by mixing the baseband signal (i.e., upconverting the baseband signal). Upon receiving this upconverted signal, the system can filter and mix the received passband signal according to the local oscillatory frequency of the system, thereby down-converting the received passband to a received baseband signal.

In another implementation, the system can receive a signal over multiple frequency bands and can further improve the accuracy of the carrier phase refinement process further described below. In this implementation, the system can receive a signal including passband signals of multiple different frequencies, each modulated by the baseband signal.

5. Signal Reception

Thus, in Block S110, the system receives the signal of a duration including the carrier signal modulated by the code sequence. The system can receive a version of the signal that has been subjected to multipath fading, Doppler shifts, and/or other interference in addition to general additive electromagnetic noise. Upon receiving the signal at the antenna and filtering the signal to generate a received passband signal; the system demodulates the signal according to the modulation scheme of the signal to generate a received baseband signal that is a multipath faded version of the transmitted baseband signal.

When executing the desynchronized demodulation variation of the method S100, the system desynchronizes the received baseband signal relative to the transmitted baseband signal by selecting a local oscillator frequency offset from the carrier frequency of the transmitted passband signal (based on the desynchronization ratio) and demodulating passband signal according to this local oscillator frequency.

When executing the desynchronized sampling variation of the method S100, the system desynchronizes a set of digital samples sampled from the received baseband signal relative to the transmitted baseband signal by selecting a receiver sampling frequency offset from the transmitter chip frequency of the signal (based on the desynchronization ratio) and samples the received baseband signal according to this receiver sampling frequency. Each of these variations are mathematically equivalent for the purpose of calculating a LOS TOA for the signal and are described in further details below.

5.1 Desynchronized Demodulation Variation

Figure 4A:
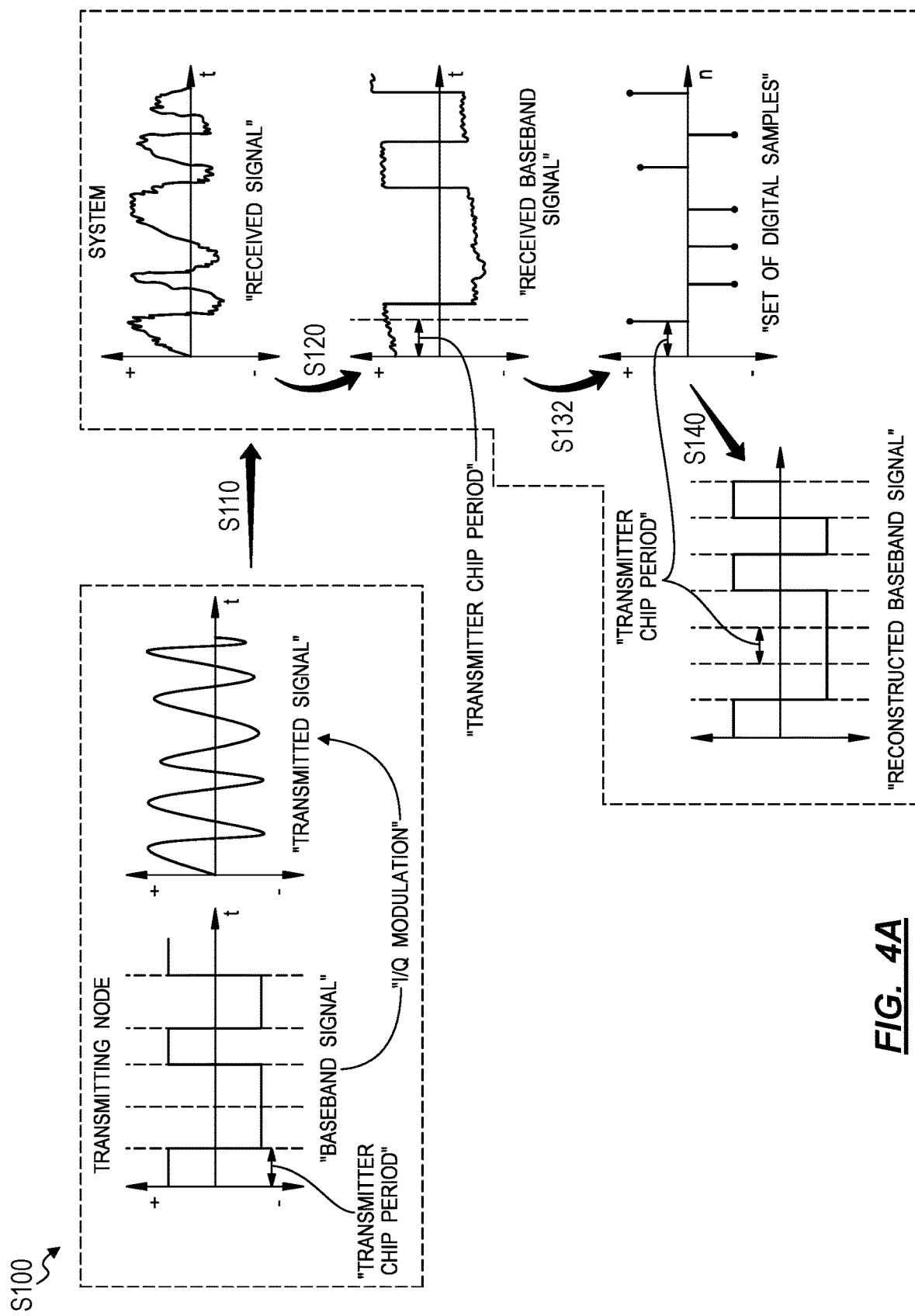
FIG. 4A is a flowchart representation of one variation of the method.

Generally, as shown in FIG. 4A, the system can execute the desynchronized demodulation variation of the method S100 in order to desynchronize symbols in the received baseband signal from the symbols in the transmitted baseband signal (i.e., the template signal) such that, upon reconstruction of received baseband signal, the system can calculate a cross-correlation function between the two functions on a fine-time grid with a time resolution less than the symbol time. Thus, upon cross-correlating the reconstructed baseband signal with the template signal, the amplitude response of the cross-correlation function varies continuously (approximately continuously on a fine time grid) with the dummy variable (i.e., a time offset of the reconstructed baseband signal and the template signal) resulting in a sharp cross-correlation peak, as opposed to resulting in a symbol-width cross-correlation peak, upon symbol alignment of the reconstructed baseband signal and the template signal. Additionally, the system can further improve the aforementioned desynchronization effect by controlling the desynchronization ratio defined by the local oscillator frequency and the carrier frequency of the signal.

5.1.1 Desynchronized Demodulation

Generally, in Block S120, the system can demodulate (e.g., down-convert) the signal to generate an analog, multipath-faded baseband signal from the (baseband or passband) received baseband signal r(t). This analog signal contains information about the TOA of the analog received signal (in both the carrier phase of the analog received signal and the time variation of the analog received signal), but the unknown multipath profile leads to an uncertainty in the time of arrival given by the delay spread of the multipath profile (tens to thousands of nanoseconds for a typical cellular wireless signal). The (analog) passband signal received at the antenna of the system is modeled as follows when subjected to multipath fading:

$$x(t) = \sum_{m=0}^{M-1} s(t - \tau_m) \alpha_m e^{j(2\pi f_c(t-\tau_m)+\phi_m)},$$

where M is the number of detectable multipath components, $\tau_m$ represents the delay associated with the $m^{th}$ multipath, am represents the amplitude associated with the $m^{th}$ multipath, $\phi m$ represents the phase associated with the $m^{th}$ multipath. Thus, the received signal can be modeled as a superposition of M multipath components, with the delay spread given by the difference between the minimum and the maximum delay components.

During a standard direct down-conversion demodulation process (where the local oscillator frequency matches the carrier frequency), the system demodulates the received passband signal by mixing the received passband signal with a quadrature signal at the carrier frequency, $f_c$, resulting in a received baseband signal as modeled below:

$$r(t) = \sum_{m=0}^{M-1} s(t - \tau_m) \alpha_m e^{j(2\pi f_c \tau_m - \phi_m)}.$$

However, due to the desynchronization between the local oscillator frequency $f_{LO}$ and the carrier frequency, $f_c$, the resulting received baseband signal is modeled as follows:

$$r(t) = \sum_{m=0}^{M-1} s(t - \tau_m) \alpha_m e^{j(2\pi f_c R(t-\tau_m)+\phi_m)},$$

where $R = \dfrac{f_c - f_{LO}}{f_c} = \dfrac{f_d}{f_c}$ represents the desynchronization ratio. Given the narrowband approximation, the expression simplifies to:

$$r(t) \approx \sum_{m=0}^{M-1} s(t) \alpha_m e^{j(2\pi f_c R(t-\tau_m)+\phi_m)}.$$

Thus, the system generates a received baseband signal r(t) including information identifying the TOA of each multipath component of the signal. The system can control the particular value of $f_{LO}$ and $f_c$ in order to maintain the desynchronization ratio of $R=R_{num}/R_{den}$ such that the ratio, represented in irreducible form (e.g., where $R_{num}$, $R_{den} \in Z$ and where $R_{num}$ and $R_{den}$ have no common factors), defines a denominator, $R_{den}$ greater than a threshold denominator. In order to achieve subsample TOA accuracy, the system can set the threshold denominator proportional to the target accuracy of the TOA calculation. For example, in applications in which the system is configured to calculate a TOA with a subsample accuracy of better than one nanosecond, the system can adjust $f_{LO}$ relative to $f_c$ such that $R_{den}$ is greater than $1 \cdot 10^9$. In one implementation, the system can: detect the value of $f_c$ in the signal and adjust $f_{LO}$ relative to the detected $f_c$ such that the denominator, $R_{den}$, exceeds the threshold denominator.

In one implementation, the system can generate a value for R by approximating an irrational number (e.g., by minimizing the error of R relative to some irrational number such as via) in order to increase $R_{den}$ above the threshold denominator.

In another implementation, the system can calculate the LOS TOA to within a sample period by executing a standard matched filter, and then refining the coarse TOA estimate to sub-sample accuracy using the carrier phase information obtained via the desynchronized down-conversion process, as is further described below.

5.1.2 Sampling

Generally, in Block S132, the system can sample the received baseband signal, at a receiver sampling period equal to the transmitter chip period, in order to generate a set of digital samples (i.e., a complex digital signal), r[n], of the received baseband signal, r(t). More specifically, the system can sample the received baseband signal to generate a set of digital samples described as follows:

$$r[n] = \sum_{m=0}^{M-1} s(nT_c')e^{j(2\pi f_c R(nT_c' - \tau_m) + \phi_m)}.$$

5.2 Desynchronized Sampling Variation

Figure 4B:
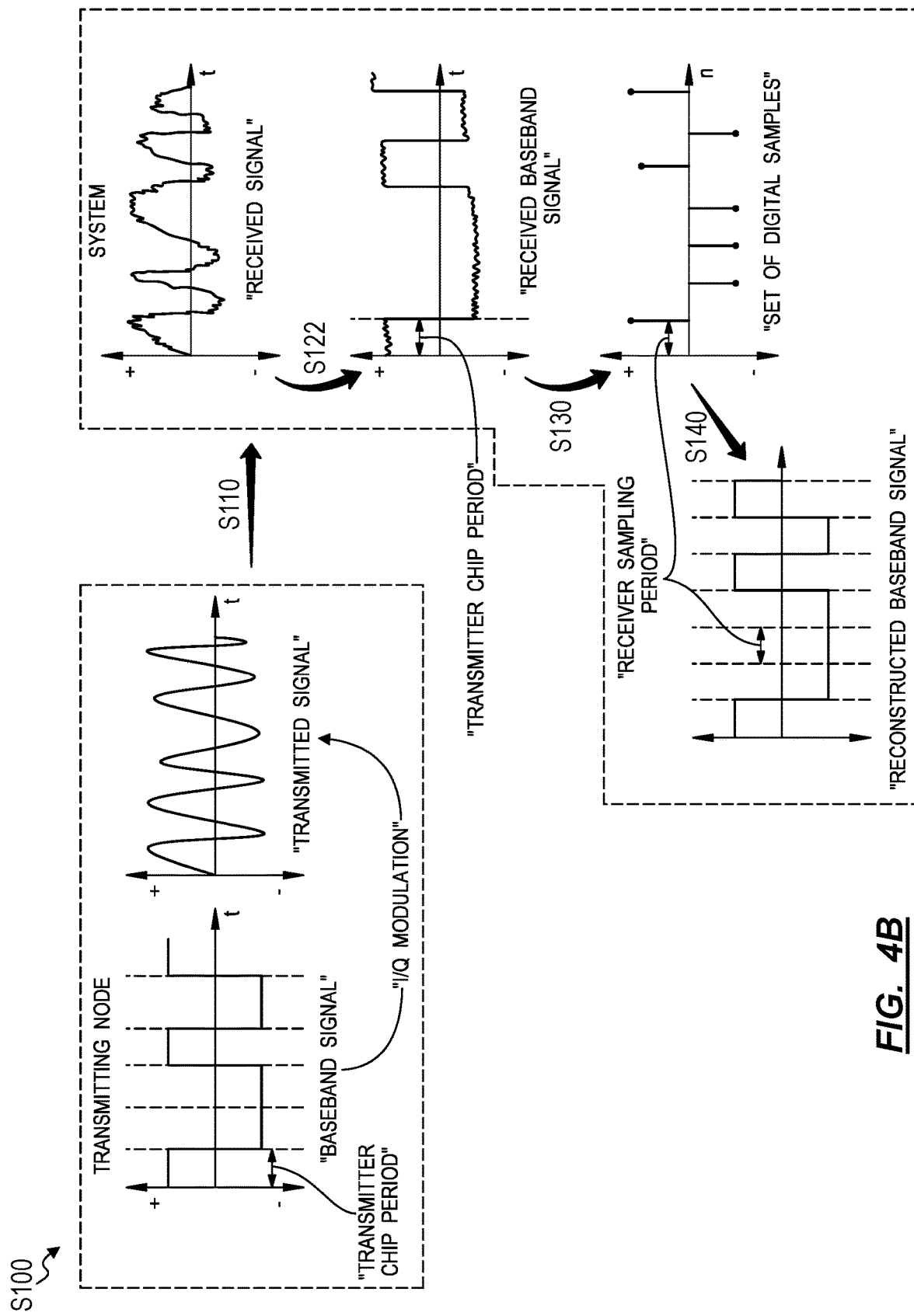
FIG. 4B is a flowchart representation of one variation of the method.

Generally, as shown in FIG. 4B, the system can execute the desynchronized sampling variation of the method S100 in order to desynchronize symbols in the received baseband signal from the symbols in the transmitted baseband signal (i.e., the template signal). However, instead of desynchronizing the local oscillator frequency at the system from the carrier frequency of the signal, the system desynchronizes the digital sampling rate from the transmitter component rate characterizing the code sequence. Upon reconstruction of received baseband signal, the system can calculate a cross-correlation function between the two functions on a fine time grid with a time resolution less than sampling rate of the system. Thus, the system can similarly improve the properties of the cross-correlation function generated by cross-correlating the reconstructed baseband signal with the template signal as described above.

5.2.1 Demodulation

Generally, in Block S122, the system can down-convert the signal by mixing the signal with a local oscillator frequency equal to the carrier frequency to generate a received signal. More specifically, the system can recover an analog multipath faded baseband signal from the (baseband or passband) received signal r(t). This analog signal contains information about the TOA of the analog received signal (in both the carrier phase of the analog received signal and the time variation of the analog received signal), but the unknown multipath profile leads to an uncertainty in the time of arrival given by the delay spread of the multipath profile (tens to thousands of nanoseconds for a typical cellular wireless signal). The (analog) baseband received signal can be described as follows when subjected to multipath fading:

$$r(t) = \sum_{m=0}^{M-1} s(t - \tau_m)\alpha_m e^{j(2\pi f_c \tau_m - \phi_m)}$$

where M is the number of detectable multipath components, $T_m$ is the delay associated with the $m^{th}$ multipath, $\alpha_m$ is the amplitude associated with the $m^{th}$ multipath, and $\phi_m$ is the phase associated with the $m^{th}$ multipath. Thus, the received signal can be modeled as a superposition of M multipath components, with the delay spread given by the difference between the minimum and the maximum delay components.

5.2.2 Desynchronized Sampling

After generating the analog received signal, in Block S130, the system can sample the received signal at a receiver sampling period different from the transmitter chip period to generate a set of digital samples such that the desynchronization ratio, $T_c/T'_c$, of the receiver sampling period to the transmitter chip period approximates an irrational number and is characterized by a large denominator (when expressed in its irreducible form). More specifically, the system can sample digital samples from the received baseband signal at a receiver sampling period, $T_c$ that is different from the transmitter chip period, $T'_c$, and wherein $T_c/T'_c$, approximates an irrational number. Thus, the system can obtain sub-sample accuracy upon implementation of the matched filter due to intentional desynchronized digital sampling of the received signal. The system can sample the received signal at a receiver sampling period that is greater than or less than the transmitter chip period. The system can also define the receiver sampling period as greater than half of the chip frequency and less than double the chip frequency or within the constraints of the system's digital signal processor (hereinafter "DSP").

In one implementation, the system can define the receiver sampling period such that the desynchronization ratio $T_c/T'_c$, in irreducible form, is characterized by a large denominator. Additionally or alternatively, the system selects the receiver sampling period, $T_c$, such that $T_c/T'_c$, approximates an irrational number, thereby further increasing the resolution of the system for arbitrarily long signals. In another implementation, the system selects a receiver sampling period such that $T_c/T'_c$ in irreducible form has the largest denominator possible given the sampling jitter characteristics of the system's ADC and/or DSP.

Thus, upon unsynchronized sampling of the received signal, the system generates a set of digital samples, r[n], defined as:

$$\{r[n] \triangleq r(nT_c)\}_{n=-\infty}^{\infty}$$

6. Super-Resolved Matched Filter

Generally, the system can calculate a cross-correlation function of a reconstructed baseband signal $p_1(t)$ (based on the set of digital samples r[n]) and a template signal $p_2$ (identical to the initial signal s(t)). Thus, the system executes a super-resolved matched filter by calculating the cross-correlation function of the two desynchronized signals to obtain peaks of the cross-correlation function corresponding to the TOA of each multipath component of the signal to a level of accuracy finer than either the transmitter chip period or the receiver sampling period. Therefore, the system can identify the earliest peak of the cross-correlation function in order to obtain a coarse estimate of the TOA of the LOS component of the signal.

6.1 Baseband Signal Reconstruction

Generally, in Blocks S140, the system can generate, on a fine time grid a reconstructed baseband signal that approximates the continuous time baseband signal received at the system. More specifically, the system can generate the reconstructed baseband signal, $p_1(t)$ from the set of digital samples, $r[n]$ based on the pulse shape of the of the chip waveform $g'(t)$.

For example, if the pulse shape for the baseband signal is a rectangular pulse, then the system can use a zero-order hold to generate a reconstructed baseband signal from the set of digital samples. Alternatively, the system can implement another piecewise function of pulse shape $g'(t)$ to match the form of the signal. In one implementation, the system can execute a digital-to-analog conversion with a piecewise function of pulse shape $g(t)$ different from $g'(t)$ to improve the peak width of the amplitude response of the cross-correlation function. In yet another alternative, the system's DAC can include a reconstruction filter to smooth the unsynchronized signal in order to obtain specific characteristics in the cross-correlation function.

In one implementation, the system can generate the reconstructed baseband signal based on pulse shapes such as a sine pulse, a raised cosine pulse, or a Gaussian pulse. Additionally or alternatively, the system can interpolate sections of reconstructed baseband signal via linear, quadratic, or polynomial interpolation of the set of digital samples, $r[n]$. Thus, the system can: during a time slot, receive the signal comprising the template signal defining the code sequence modulated according to the carrier signal characterized by the carrier frequency, the code sequence characterized by the transmitter chip period and a pulse shape; and generate, on the fine time grid, the reconstructed baseband signal based on the set of digital samples and the pulse shape.

Generally, the system generates the reconstructed baseband signal characterized by a chip rate that corresponds to the sampling rate of the set of digital samples $r[n]$. Therefore, in the desynchronized demodulation variation, the system can generate a reconstructed baseband signal $p_1(t)$ of the form:

$$p_1(t) = \sum_{n=-\infty}^{\infty} r[n]g(t - nT_c')$$

Thus, in desynchronized demodulation variation, the reconstructed baseband signal is characterized by the same chip rate as the signal.

Alternatively, in the desynchronized sampling variation, the chip rate associated with the reconstructed baseband signal corresponds to the receiver sampling period, $T_c$, as opposed to the transmitter chip period $T'_c$, thereby indicating that the reconstructed baseband signal is desynchronized relative to the template signal. Therefore, in the desynchronized sampling variation, the system can generate a reconstructed baseband signal of the form:

$$p_1(t) = \sum_{n=-\infty}^{\infty} r[n]g(t - nT_c).$$

In one implementation, the system digitally approximates the reconstructed baseband signal (e.g., by evaluating the signal at a sample rate substantially higher than the receiver sampling rate) in order to calculate the cross-correlation of the reconstructed baseband signal and the template signal on a fine time grid, as further described below. Additionally or alternatively, the system can generate the reconstructed baseband signal on a fine time grid significantly smaller than the target accuracy of the LOS TOA calculation. For example, the system can generate the reconstructed baseband signal on a fine time grid with a resolution of 0.1 nanoseconds. Additionally or alternatively, the system can calculate the time resolution of the fine time grid based the denominator of the desynchronization ratio.

6.2 Template Signal

To execute the super-resolved digital matched filter, the system accesses a template signal, $p_2(t)$, matching the baseband signal $s(t)$ in order to detect multipath components in the unsynchronized signal. Thus:

$$p_2(t) = s(t) = \sum_{n=0}^{N-1} b_n g'(t - nT_c').$$

The periodicity of the template signal corresponds to the transmitter chip period, $T'_c$, as opposed to the receiver sampling period, $T_c$.

6.3 Cross-Correlation Function

Upon generating the reconstructed baseband signal and accessing the template signal, the system can calculate a cross-correlation function of the signals, thereby calculating a super-resolved matched filter in Block S150. More specifically, the system can calculate, on the fine time grid, a cross-correlation function comprising a cross-correlation of the reconstructed baseband signal and the template signal. When calculating the cross-correlation function, the system integrates via a dummy variable, $\tau$, that corresponds to the delay time relative to some arbitrarily defined time (e.g., an absolute time tracked by the system). Thus, as $N \to \infty$, amplitude peaks of the cross-correlation function approach the TOAs of various multipath components of the signal, while the phase of the cross-correlation function approaches the carrier phase associated with each multipath component at the receiver.

Therefore, the system can calculate a super-resolved approximation of the continuous-time cross-correlation function of the following form:

$$C(\tau) = \int p_1(t-\tau)p_2(t)^* dt.$$

Furthermore, $$C(\tau) = \sum_{m=0}^{M-1} \alpha_m e^{j(2\pi f_c \tau_m + \phi_m)} S(\tau - \tau_m).$$

Assuming the desynchronization ratio ($T_c/T'_c$ or R) approximates an irrational number and assuming sequence $\{b_n\}_{n=0}^{\infty}$ has uncorrelated elements (e.g., an independent and identically distributed binary sequence), $S(\tau)$ approaches $\delta(\tau)$ as $N \to \infty$, wherein $S(\tau)$ is the characteristic peak shape of the cross-correlation function, which is a function of the sequence $\{b_n\}_{n=0}^{\infty}$, the pulse shapes $g(t)$ and $g'(t)$, the particular desynchronization ratio of and the value of N. An example of the amplitude response of the cross-correlation function $C(\tau)$ is shown in FIG. 5. Note that the width of the correlation peak (roughly one nanosecond) as shown is significantly shorter than the sampling period at either the transmitter or the receiver (roughly 100 nanoseconds).

7. Amplitude Response Peak Identification

Upon calculating the cross-correlation function, $C(\tau)$, in Block S160, the system can identify an earliest peak time (corresponding to the smallest value of $\tau$), in a set of peak times based on an earliest local maximum in the amplitude response of the cross-correlation function, $\|C(\tau)\|$. In particular, the system can calculate, on the fine time grid, the time-of-arrival of the signal based on an earliest peak time in a set of peak times, each peak time in the set of peak times corresponding to a local maximum in an amplitude response of the cross-correlation function. Additionally or alternatively, the system can also calculate, on the fine time grid, the time-of-arrival of the signal based on a maximum time corresponding to a global maximum in an amplitude response of the cross-correlation function. In this alternative implementation, the system can reduce the computational overhead of the calculation by assuming the earliest peak time is also characterized by the highest SNR and, therefore, corresponds to the global maximum of the cross-correlation function.

The system can calculate the values of that correspond with a peak of the amplitude response of the cross-correlation function, $\{\hat{\tau}_m\}_{m=0}^{\hat{M}-1}$. These values of $\{\hat{\tau}_m\}_{m=0}^{\hat{M}-1}$ are an approximation of the actual sequence of multipath delay times $\{\tau_m\}_{m=0}^{M-1}$, where $\hat{M}$ is the number of peaks observable in $|C(\tau)|$, while M is the actual number of multipath components of the signal.

For signals characterized by arbitrarily large signal lengths, N, $\{\hat{\tau}_m\}_{m=0}^{\hat{M}-1} \approx \{\tau_m\}_{m=0}^{M-1}$. Therefore, if N is large (e.g., corresponding to a ten millisecond signal duration), the system can select $\hat{\tau}_0$ as the TOA of the earliest multipath component of the signal (i.e., the LOS component of the signal assuming the LOS component is not obstructed), thereby calculating the TOA of the signal to a high degree of accuracy. However, for signals of smaller signal length N (e.g., corresponding to a ten microsecond signal or a 100 microsecond signal), the peaks in the amplitude response of the cross-correlation function are broader and therefore less accurate with respect to an exact TOA with an error on the order of the lesser of the receiver sampling period and/or the delay spread (e.g., a single peak may actually be the result of a superposition of two irresolvable peaks). Therefore, in some circumstances, (e.g., in order to determine the LOS TOA of the signal to within one nanosecond with a smaller signal length), the system can recover a carrier phase of the multipath component corresponding to each $\hat{\tau}_m$ and refine the TOA estimate, $\hat{\tau}_m$, based on carrier phase refinement techniques to improve the calculation of the TOA for the signal of equal signal length. Alternatively, the system can execute a deconvolution algorithm to refine the calculation of the TOA of the signal based on the specific characteristics of the peak shape of the cross-correlation function. Furthermore, the system can execute an adaptive signal length algorithm to increase the signal length in order to achieve a target accuracy (either for final TOA calculation or for improved phase recovery). Each of these implementations are further described below.

8. Deconvolution Based Time-of-Arrival Detection

In one implementation, the system can refine the calculated TOA of the signal by utilizing a deconvolution approach. More specifically, the system can calculate an ideal peak shape based on a signal duration (i.e., signal length), the transmitter chip period, the carrier frequency, and the local oscillator frequency; and calculate a deconvolution function of the ideal peak shape and the cross-correlation function to generate a set of times-of-arrival, each time-of-arrival corresponding to a multipath component of the signal; and identify the time of arrival as the earliest time-of-arrival in the set of times-of-arrival. Thus, by pre-calculating the ideal peak shape, $S(\tau)$ (i.e., assuming an ideal channel response $S(\tau)$, perfect noiseless reception and sampling of the signal), at various signal lengths N and at various values of the desynchronization ratio for a given code sequence $\{b_n\}_{n=0}^{\infty}$, the system can solve a deconvolution problem to extract the TOA of each multipath component of the signal. Therefore, the system can calculate an ideal peak shape as a multivariable function:

$$S(\tau, N, T_c, T'_c) = \int \left(\sum_{n=0}^{N-1} b_n g'(t - \tau - nT'_c)\right)\left(\sum_{n=0}^{N-1} b_n g(t - nT_c)\right)^* dt.$$

Thus, upon calculating the ideal peak shape given $\tau$, N, $T_c/T'_c$, and $\{b_n\}_{n=0}^{\infty}$, the system can then solve a deconvolution problem of the following form:

$$(S(\tau,N,T_c,T'_c) * h(\tau)) + \epsilon = C(\tau),$$

where $\epsilon$ is accumulated noise and h(T) represents channel impulse response function defined parametrically as follows:

$$h(\tau) = \sum_{m=0}^{M-1} \alpha_m e^{j2\pi f_c \tau_m + \phi_m} \delta(\tau - \tau_m).$$

Thus, upon solving the above deconvolution problem (and compensating for noise $\epsilon$), the system can recover $\{(\alpha_m, \phi_m, \tau_m)\}_{m=0}^{M-1}$ and select $\tau_0$ as the TOA of the signal.

The system can execute any deconvolution algorithm to solve the above described relation including Fourier transformation and/or numerical deconvolution techniques (with or without super-resolution algorithms).

9. Phase Recovery

Generally, in Block S170, the system can identify a phase, $\hat{\phi}_0$ corresponding to the earliest peak time ($\hat{\tau}_0$ of $\{\hat{\tau}_m\}_{m=0}^{\hat{M}-1}$) based on the phase response of the cross-correlation function, $\angle C(\tau)$ at the peak location. More specifically, identify a phase corresponding to the earliest peak time in a phase response of the cross-correlation function; and refine the earliest peak time based on the phase to calculate the time-of-arrival of the signal.

Upon detecting the delay times of each peak according to the amplitude response of the cross-correlation function, the system can access the corresponding phase response of the cross-correlation function at the same ($\angle C(\hat{\tau}_0) = \hat{\phi}_0$). Because of the properties of the cross-correlation function, the phase response is typically flat around peaks in the amplitude response of the cross-correlation function. Therefore, $\hat{\phi}_0 = \phi_0$ even for smaller signal lengths (with wider correlation peaks). Thus, the system can recover an accurate phase $\phi_0$ corresponding to the LOS multipath component of the signal even if $\hat{\tau}_0$ does not accurately represent the TOA of the LOS multipath component (due to a small value of N). As such, the method S100 provides a means for detecting an accurate LOS phase of the signal at small signal lengths enabling the system to further refine LOS TOA estimates.

9.1 Multiband Phase-Based Time-of-Arrival Refinement

Generally, in Block S180, upon recovering $\hat{\phi}_0 \approx \phi_0$ over multiple frequency bands, the system can refine the earliest peak time, $\hat{\tau}_0$, based on recovered phase measurements, to calculate an LOS TOA for the signal, $\tau_0$. More specifically, the system can: receive the same baseband signal multiband signal of a low bandwidth (approximately 1-5 MHz) at several (i) carrier frequencies $f_{c,i}$ (over any legally available band, such as the 902-928 MHz ISM band or sub-GHz cellular band); calculate $\hat{\tau}_{0,i}$ and $\hat{\phi}_{0,i}$ for each band of the signal; and execute statistical techniques to calculate $\tau_0$.

Additionally, as part of a two-way time-transfer protocol, the system can access a transmission time $\tau_s$ at the transmitting node in order to calculate the propagation time of the signal, $\tau_0-\tau_s$, based on multiple values of $\hat{\phi}_{0,i}$ for different carrier frequencies of the signal. Upon calculating the propagation time of the signal, the system can then calculate $\tau_0$ given time synchronization between the system and the transmitting node (further described in U.S. patent application Ser. No. 16/405,922). Thus, the system can calculate a LOS TOA of a signal for signals of smaller signal length N.

In particular, the system executes statistical techniques to estimate $\tau_0$ based on the following relationship:

$$\hat{\phi}_{0,i}=2k\pi f_{c,i}(\tau_0-\tau_s) \bmod 2\pi,$$

where i is the index of the carrier frequency, k is a predetermined constant (e.g., k=2), and $\tau_s$ is the time of transmission of the signal (communicated by the transmitting node). More specifically, the system can calculate a value for $\tau_0-\tau_s$ by finding the value for $\tau_0-\tau_s$ that best fits the set of LOS phases $\hat{\phi}_{0,i}$ across multiple frequency bands, while accounting for outliers and or other statistical artifacts.

In one implementation, the system can define the set, G, according to the following equation:

$$G = \left\{\frac{\hat{\phi}_{0,i}+n2\pi}{2\pi f_{c,i}}: n \in Z\right\}.$$

Subsequently, the system can calculate the following function G:

$$f(\tau)=|\{\hat{\tau}:|\hat{\tau}-\tau|<tns, \hat{\tau} \in G\}|,$$

where t is a tunable parameter (e.g., equal to 2 nanoseconds). The system can then solve for $\tau_0$ according to the following equation:

$$\mathrm{argmax}_\tau f(\tau)=k(\tau_0-\tau_s).$$

If k=2 $\mathrm{argmax}_\tau f(\tau)$ directly yields an estimate for $2(\tau_0-\tau_s)$ from which the delay, $(\tau_0-\tau_s)$, can be calculated by dividing by 2. Thus, the system can calculate a best fit value for the LOS TOA of the signal based on the LOS phases for each frequency component of the signal.

If multiple maxima exist, the system can return a statistically processed version involving the locations of the maxima with respect to $\tau$. The system can also reference prior values of $\hat{\tau}_0$ to further improve the statistical estimate of $\tau_0$. For example, the system can detect outlier values of $\hat{\tau}_0$ from amongst a set of $\hat{\tau}_0$ from a set of frequency components of the signal. The system can then exclude the phase information corresponding to this value of $\hat{\tau}_0$ from the phase refinement process described above.

However, the system can calculate $\tau_0$ based on the estimated values for the phase and timing of the LOS multipath component of the signal for each transmitted frequency band in any other way.

10. Adaptive Signal Length

In one implementation, the system can track the width of each peak of the cross-correlation function and adaptively adjust the signal length, N, if the width of the earliest peak (corresponding to $\hat{\tau}_0$) is greater than a threshold width. Therefore, the system can communicate with the transmitting node to increase the length of the signal until the width of the earliest peak of the cross-correlation function is less than the threshold width. More specifically, the system can: during the first time slot, receive the first signal characterized by a first signal duration shorter than the first time slot; upon calculating a LOS TOA of the first signal, calculate a first uncertainty of the first time-of-arrival based on a first peak width of the first earliest peak time corresponding to the LOS TOA; in response to the first uncertainty exceeding a threshold uncertainty, configure a transmitting node to transmit a second signal characterized by a second signal duration longer than the first signal duration and shorter than a second time slot; and upon calculating a LOS TOA of the second signal, calculate a second uncertainty of the second time-of-arrival less than the first uncertainty based on a second peak width of the second earliest peak time less than the first peak width.

The system can select the threshold width and/or the corresponding uncertainty based on target confidence interval for the LOS TOA of the signal. Alternatively, the system can select the threshold width such that the phase response of the cross-correlation function is substantially flat across the width of the earliest peak, thereby enabling the system to extract a phase, $\hat{\phi}_0$, from the phase response of the cross-correlation function $\angle C(\tau)$.

11. Iterative Ranging Process

In one implementation, the system can iteratively execute Blocks of the method S100 based on successive signals received by the system in order to refine the LOS signal propagation time in the context of a two-way ranging scheme. More specifically, the system can: receive a signal characterized by a known departure time; extract a phase $\hat{\phi}_0$ from the phase response of the cross-correlation function calculated by the system; estimate a propagation time for the signal based on the phase $\hat{\phi}_0$; and receive a successive signal from the same transmitting node; and narrow the subsequent peak in the amplitude response of the cross-correlation function for the successive signal based on the estimated propagation time. Thus, in applications in which a sufficiently accurate propagation time is not measured based on a first signal between the transmitting node and the system, the system can process multiple successive signals and improve the estimate of the propagation time of the signal from the transmitting node to the system based on the phase information corresponding to the LOS TOA extracted from the phase response of the cross-correlation function to. Therefore, in implementations in which the TDMA slot allocated for the signal is short (e.g., on the order of tens or hundreds of microseconds), the system can still execute Blocks of the method S100 to iteratively refine the propagation time of the signal.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for detecting times-of-arrival of signals comprising, at a receiving node:
    during a first time slot, receiving a first signal comprising a first carrier signal:
        characterized by a first carrier frequency; and
        modulated by a first template signal defining a first code sequence characterized by a transmitter chip period;
    demodulating the first signal according to a first local oscillator frequency to generate a first received baseband signal, the first local oscillator frequency and the first carrier frequency defining a first desynchronization ratio in irreducible form characterized by a first denominator greater than a threshold denominator;
    sampling the first received baseband signal at the transmitter chip period to generate a first set of digital samples;
    generating, on a fine time grid, a first reconstructed baseband signal based on the first set of digital samples, the fine time grid characterized by a time resolution less than the transmitter chip period;
    calculating, on the fine time grid, a first cross-correlation function comprising a cross-correlation of the first reconstructed baseband signal and the first template signal; and
    calculating, on the fine time grid, a first time-of-arrival of the first signal based on a first earliest peak time in a first set of peak times, each peak time in the first set of peak times corresponding to a local maximum in a first amplitude response of the first cross-correlation function.

2. The method of claim 1, wherein calculating, on the fine time grid, the first time-of-arrival of the first signal based on the first earliest peak time in the first set of peak times comprises:
    identifying a phase corresponding to the first earliest peak time in a first phase response of the first cross-correlation function; and
    refining the first earliest peak time based on the phase to calculate the first time-of-arrival of the first signal.

3. The method of claim 1:
    wherein, during the first time slot, receiving the first signal comprises, during the first time slot, receiving the first signal characterized by a first signal duration shorter than the first time slot and comprising the first carrier signal:
        characterized by the first carrier frequency; and
        modulated by the first template signal defining the first code sequence characterized by the transmitter chip period;
    further comprising:
    calculating a first uncertainty of the first time-of-arrival based on a first peak width of the first earliest peak time;
    in response to the first uncertainty exceeding a threshold uncertainty, configuring a transmitting node to transmit a second signal characterized by a second signal duration longer than the first signal duration and shorter than a second time slot and comprising a second carrier signal:
        characterized by a second carrier frequency; and
        modulated by a second template signal defining a second code sequence characterized by a transmitter chip period;
    during the second time slot, receiving the second signal;
    demodulating the second signal according to the first local oscillator frequency to generate a second received baseband signal;
    sampling the second received baseband signal at the transmitter chip period to generate a second set of digital samples;
    generating, on the fine time grid, a second reconstructed baseband signal based on the second set of digital samples;
    calculating, on the fine time grid, a second cross-correlation function comprising a cross-correlation of the second reconstructed baseband signal and the second template signal;
    calculating, on the fine time grid, a second time-of-arrival of the second signal based on a second earliest peak time in a second set of peak times, each peak time in the second set of peak times corresponding to a local maximum in a second amplitude response of the second cross-correlation function; and
    calculating a second uncertainty of the second time-of-arrival less than the first uncertainty based on a second peak width of the second earliest peak time less than the first peak width.

4. The method of claim 1:
    wherein, during the first time slot, receiving the first signal comprises, during the first time slot, receiving the first signal comprising:
    a first frequency component comprising the first carrier signal:
        characterized by the first carrier frequency; and
        modulated by the first template signal defining the first code sequence characterized by the transmitter chip period;
    a second frequency component comprising a second carrier signal:
        characterized by a second carrier frequency; and
        modulated by the first template signal defining the first code sequence characterized by the transmitter chip period;
    wherein demodulating the first signal according to the first local oscillator frequency to generate the first received baseband signal comprises:
    demodulating the first frequency component according to the first local oscillator frequency to generate the first received baseband signal; and
    demodulating the second frequency component according to a second local oscillator frequency to generate a second received baseband signal, the second local oscillator frequency and the second carrier frequency defining a second desynchronization ratio in irreducible form characterized by a second denominator greater than the threshold denominator;
further comprising:
sampling the second received baseband signal at the transmitter chip period to generate a second set of digital samples;
generating, on the fine time grid, a second reconstructed baseband signal based on the second set of digital samples; and
calculating, on the fine time grid, a second cross-correlation function comprising a cross-correlation of the second reconstructed baseband signal and the first template signal; and
wherein calculating, on the fine time grid, the first time-of-arrival of the first signal based on the first cross-correlation function comprises:
calculating, on the fine time grid, a first earliest peak time in a first set of peak times, each peak time in the first set of peak times corresponding to a local maximum in a first amplitude response of the first cross-correlation function;
calculating, on the fine time grid, a second earliest peak time in a second set of peak times, each peak time in the second set of peak times corresponding to a local maximum in a second amplitude response of the second cross-correlation function;
identifying a first phase corresponding to the first earliest peak time in a first phase response of the first cross-correlation function;
identifying a second phase corresponding to the second earliest peak time in a second phase response of the second cross-correlation function; and
refining the first earliest peak time and the second earliest peak time based on the first phase and the second phase to calculate the first time-of-arrival of the first signal.

5. The method of claim 4, wherein refining the first earliest peak time and the second earliest peak time based on the first phase and the second phase to calculate the first time-of-arrival of the first signal comprises:
accessing a first time-of-departure of the first signal; and
calculating a best fit value of the first time-of-arrival based on the first phase, the second phase, and the first time-of-departure.

6. The method of claim 4:
further comprising calculating a difference between the first earliest peak time and the second earliest peak time; and
wherein refining the first earliest peak time and the second earliest peak time based on the first phase and the second phase to calculate the first time-of-arrival of the first signal comprises, in response to the difference exceeding a threshold difference, refining the first earliest peak time and the second earliest peak time based on the first phase and the second phase to calculate the first time-of-arrival of the first signal.

7. The method of claim 1, further comprising calculating the time resolution of the fine time grid based on the first denominator.

8. A method for detecting times-of-arrival of signals comprising:
receiving a signal comprising a template signal defining a code sequence characterized by a transmitter chip period;
demodulating the signal to generate a received baseband signal;
sampling the received baseband signal at a receiver sampling period to generate a set of digital samples, the receiver sampling period and the transmitter chip period defining a desynchronization ratio in irreducible form characterized by a denominator greater than a threshold denominator;
generating, on a fine time grid, a reconstructed baseband signal based on the set of digital samples, the fine time grid characterized by a time resolution less than the receiver sampling period and less than the transmitter chip period;
calculating, on the fine time grid, a cross-correlation function comprising a cross-correlation of the reconstructed baseband signal and the template signal; and
calculating, on the fine time grid, the time-of-arrival of the signal based on an earliest peak time in a set of peak times, each peak time in the set of peak times corresponding to a local maximum in an amplitude response of the cross-correlation function.

9. The method of claim 8, wherein calculating, on the fine time grid, the time-of-arrival of the signal based on the earliest peak time in the set of peak times comprises:
identifying a phase corresponding to the earliest peak time in a phase response of the cross-correlation function; and
refining the earliest peak time based on the phase to calculate the time-of-arrival of the signal.

10. The method of claim 8, wherein calculating, on the fine time grid, the time-of-arrival of the signal based on the earliest peak time in the set of peak times comprises:
calculating a peak width corresponding to the earliest peak time in the amplitude response of the cross-correlation function;
calculating the time-of-arrival of the signal based on the earliest peak time in the set of peak times; and
calculating an uncertainty of the time-of-arrival based on the peak width corresponding to the earliest peak time.

11. A method for detecting times-of-arrival of signals comprising, at a receiving node:
during a first time slot, receiving a first signal comprising a first carrier signal:
characterized by a first carrier frequency; and
modulated by a first template signal defining a first code sequence characterized by a transmitter chip period;
demodulating the signal according to a first local oscillator frequency to generate a first received baseband signal, the first local oscillator frequency and the first carrier frequency defining a first desynchronization ratio in irreducible form characterized by a first denominator greater than a threshold denominator;
sampling the first received baseband signal at the transmitter chip period to generate a first set of digital samples;
generating, on a fine time grid, a first reconstructed baseband signal based on the first set of digital samples, the fine time grid characterized by a time resolution less than the transmitter chip period;
calculating, on the fine time grid, a first cross-correlation function comprising a cross-correlation of the first reconstructed baseband signal and the first template signal; and
calculating, on the fine time grid, a first time-of-arrival of the first signal based on a maximum time corresponding to a global maximum in an amplitude response of the first cross-correlation function.

12. A method for detecting times-of-arrival of signals comprising, at a receiving node:
- during a first time slot, receiving a first signal comprising a first carrier signal:
  - characterized by a first carrier frequency; and
  - modulated by a first template signal defining a first code sequence comprising a constant amplitude, zero autocorrelation waveform characterized by the transmitter chip period;
- demodulating the signal according to a first local oscillator frequency to generate a first received baseband signal, the first local oscillator frequency and the first carrier frequency defining a first desynchronization ratio in irreducible form characterized by a first denominator greater than a threshold denominator;
- sampling the first received baseband signal at the transmitter chip period to generate a first set of digital samples;
- generating, on a fine time grid, a first reconstructed baseband signal based on the first set of digital samples, the fine time grid characterized by a time resolution less than the transmitter chip period;
- calculating, on the fine time grid, a first cross-correlation function comprising a cross-correlation of the first reconstructed baseband signal and the first template signal; and
- calculating, on the fine time grid, a first time-of-arrival of the first signal based on the first cross-correlation function.

13. A method for detecting times-of-arrival of signals comprising, at a receiving node:
- during a first time slot, receiving a first signal comprising a first carrier signal:
  - characterized by a first carrier frequency; and
  - modulated by a first template signal defining a first code sequence characterized by a transmitter chip period and a pulse shape;
- demodulating the signal according to a first local oscillator frequency to generate a first received baseband signal, the first local oscillator frequency and the first carrier frequency defining a first desynchronization ratio in irreducible form characterized by a first denominator greater than a threshold denominator;
- sampling the first received baseband signal at the transmitter chip period to generate a first set of digital samples;
- generating, on a fine time grid, a first reconstructed baseband signal based on the first set of digital samples and the pulse shape, the fine time grid characterized by a time resolution less than the transmitter chip period;
- calculating, on the fine time grid, a first cross-correlation function comprising a cross-correlation of the first reconstructed baseband signal and the first template signal; and
- calculating, on the fine time grid, a first time-of-arrival of the first signal based on the first cross-correlation function.

14. A method for detecting times-of-arrival of signals comprising, at a receiving node:
- during a first time slot, receiving a first signal comprising a first carrier signal:
  - characterized by a first carrier frequency; and
  - modulated by a first template signal defining a first code sequence characterized by a transmitter chip period;
- demodulating the first signal according to a first local oscillator frequency to generate a first received baseband signal, the first local oscillator frequency and the first carrier frequency defining a first desynchronization ratio in irreducible form:
  - characterized by a first denominator greater than a threshold denominator; and
  - approximating an irrational number;
- sampling the first received baseband signal at the transmitter chip period to generate a first set of digital samples;
- generating, on a fine time grid, a first reconstructed baseband signal based on the first set of digital samples, the fine time grid characterized by a time resolution less than the transmitter chip period;
- calculating, on the fine time grid, a first cross-correlation function comprising a cross-correlation of the first reconstructed baseband signal and the first template signal; and
- calculating, on the fine time grid, a first time-of-arrival of the first signal based on the first cross-correlation function.

15. A method for detecting times-of-arrival of signals comprising:
- receiving a signal comprising a template signal defining a code sequence characterized by a transmitter chip period;
- demodulating the signal to generate a received baseband signal;
- sampling the received baseband signal at a receiver sampling period to generate the set of digital samples, the receiver sampling period and the transmitter chip period defining a first desynchronization ratio in irreducible form:
  - characterized by a first denominator greater than a threshold denominator; and
  - approximating an irrational number;
- generating, on a fine time grid, a reconstructed baseband signal based on the set of digital samples, the fine time grid characterized by a time resolution less than the receiver sampling period and less than the transmitter chip period;
- calculating, on the fine time grid, a cross-correlation function comprising a cross-correlation of the reconstructed baseband signal and the template signal; and
- calculating, on the fine time grid, the time-of-arrival of the signal based on the cross-correlation function.

16. A method for detecting times-of-arrival of signals comprising, at a receiving node:
- during a first time slot, receiving a first signal comprising a first carrier signal:
  - characterized by a first carrier frequency; and
  - modulated by a first template signal defining a first code sequence characterized by a transmitter chip period;
- demodulating the first signal according to a first local oscillator frequency to generate a first received baseband signal, the first local oscillator frequency and the first carrier frequency defining a first desynchronization ratio in irreducible form characterized by a first denominator greater than a threshold denominator;
- sampling the first received baseband signal at the transmitter chip period to generate a first set of digital samples;
- generating, on a fine time grid, a first reconstructed baseband signal based on the first set of digital samples, the fine time grid characterized by a time resolution less than the transmitter chip period;

calculating, on the fine time grid, a first cross-correlation function comprising a cross-correlation of the first reconstructed baseband signal and the first template signal; and calculating, on the fine time grid, a first time-of-arrival of the first signal based on the first cross-correlation comprising:

calculating an ideal peak shape based on a signal length, the transmitter chip period, the first carrier frequency, and the first local oscillator frequency;

calculating a deconvolution function of the ideal peak shape and the first cross-correlation function to generate a set of times-of-arrival, each time-of-arrival corresponding to a multipath component of the first signal; and identifying the first time of arrival as the earliest time-of-arrival in the set of times-of-arrival.

17. A method for detecting times-of-arrival of signals comprising, at a receiving node:

during a first time slot, receiving a first signal comprising a first carrier signal:

characterized by a first carrier frequency; and modulated by a first template signal defining a first code sequence characterized by a transmitter chip period;

characterizing a frequency offset between the receiving node and a transmitting node of the first signal;

calculating an adjusted first local oscillator frequency based on a first local oscillator frequency and the frequency offset, the first local oscillator frequency and the first carrier frequency defining a first desynchronization ratio in irreducible form characterized by a first denominator greater than a threshold denominator;

demodulating the first signal according to the adjusted first local oscillator frequency to generate a first received baseband signal, the adjusted first local oscillator frequency and the first carrier frequency defining the first desynchronization ratio in irreducible form characterized by the first denominator greater than the threshold denominator;

sampling the first received baseband signal at the transmitter chip period to generate a first set of digital samples;

generating, on a fine time grid, a first reconstructed baseband signal based on the first set of digital samples, the fine time grid characterized by a time resolution less than the transmitter chip period;

calculating, on the fine time grid, a first cross-correlation function comprising a cross-correlation of the first reconstructed baseband signal and the first template signal; and calculating, on the fine time grid, a first time-of-arrival of the first signal based on the first cross-correlation function.

18. A method for detecting times-of-arrival of signals comprising, at a receiving node:

characterizing a frequency drift between the receiving node and a transmitting node of the first signal;

calculating a first time slot based on the frequency drift;

configuring the transmitting node to transmit a first signal characterized by a first duration less than the first time slot;

during the first time slot, receiving the first signal comprising a first carrier signal:

characterized by a first carrier frequency; and modulated by a first template signal defining a first code sequence characterized by a transmitter chip period;

demodulating the first signal according to a first local oscillator frequency to generate a first received baseband signal, the first local oscillator frequency and the first carrier frequency defining a first desynchronization ratio in irreducible form characterized by a first denominator greater than a threshold denominator;

sampling the first received baseband signal at the transmitter chip period to generate a first set of digital samples;

generating, on a fine time grid, a first reconstructed baseband signal based on the first set of digital samples, the fine time grid characterized by a time resolution less than the transmitter chip period;

calculating, on the fine time grid, a first cross-correlation function comprising a cross-correlation of the first reconstructed baseband signal and the first template signal; and calculating, on the fine time grid, a first time-of-arrival of the first signal based on the first cross-correlation function.

* * * * *